Dec. 25, 1945.    J. S. NARATIL    2,391,588
METHOD OF PREPARING PELLETS FOR SINTERING
Filed July 14, 1943
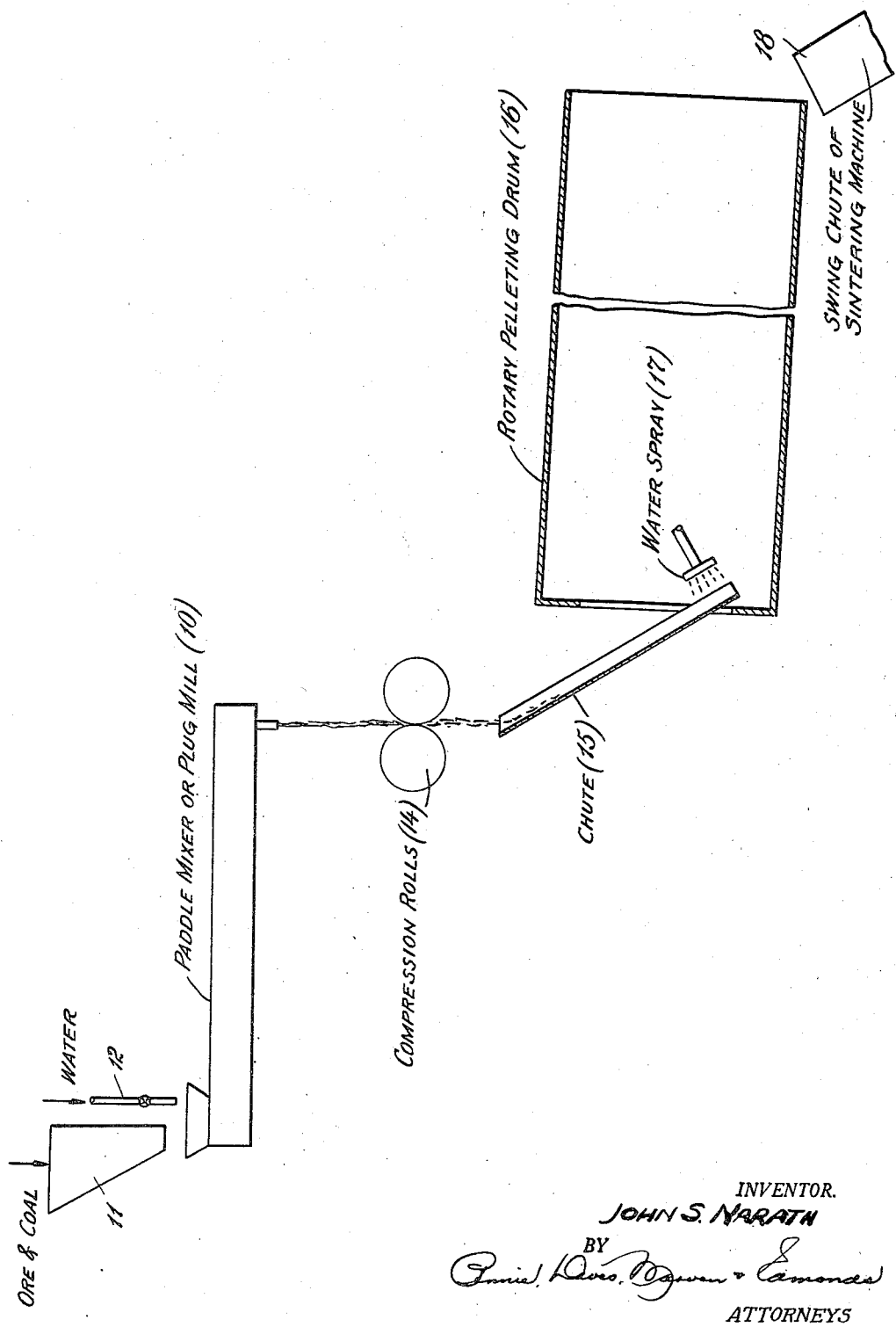
INVENTOR.
JOHN S. NARATH
BY
ATTORNEYS Patented Dec. 25, 1945

2,391,588

UNITED STATES PATENT OFFICE

2,391,588

METHOD OF PREPARING PELLETS FOR SINTERING

John S. Naratil, Palmerton, Pa., assignor to The New Jersey Zinc Company, New York, N. Y., a corporation of New Jersey Application July 14, 1943, Serial No. 494,651

8 Claims. (Cl. 75—3)

This invention is concerned with the preparation of a finely-divided charge for sintering, and provides a method for producing an improved charge for a sintering machine, for example a Dwight-Lloyd machine. The practice of the invention improves the charge for a sintering machine to such an extent that the rate of sintering may be increased markedly, with consequent increase in sintering machine capacity. At the same time, the practice of the invention results in the production of a hard sinter cake that is particularly suitable for use in subsequent metallurgical operations.

The invention is particularly applicable to the preparation of a finely-divided zinciferous charge containing lead or cadmium as an impurity to be eliminated in subsequent sintering operations. Thus the invention results in improved elimination of lead and cadmium from lead-bearing and cadmium-bearing zinc ores by sintering.

Since sintering is itself an agglomerating operation, it is usual to feed to a sintering operation a loose or fluffed-up charge. I have discovered that a densified charge is superior to the usual loose or fluffed-up charge, provided that it is densified in a particular manner.

A finely-divided charge for sintering can be densified by passing it through rolls and compressing it into flakes. However, the densification brought about by such flaking does not, in and of itself, result in improved sintering. If the charge is flaked by a single pass through the rolls, unflaked residual fines decrease the porosity of the sintering charge so that poor sintering occurs. The entire charge can be flaked by screening out the fines from the flakes and returning these fines to the rolls. A charge so formed can be sintered but the results tend to be erratic and the time required to form a good sinter is frequently too long. Moreover, a charge densified by flaking alone is in many cases too porous with the result that the individual flakes do not sinter, but merely bake.

As the result of my investigations, I have found that a superior charge for sintering can be made if the finely-divided charge is first compressed into coherent flakes (preferably by compression between rolls) and these flakes are pelleted or nodulized by rolling them on a surface (for example the interior surface of a rotating drum or tube) in the presence of moisture. Such treatment of a finely-divided charge may result in a decrease in sintering time of as much as 10% to 25%, with consequent increases of like magnitude in sintering machine capacity.

The compression of the charge into coherent flakes is so conducted that the bulk or apparent density of the flakes is substantially greater than that of the original finely-divided charge.

It is desirable to moisten the flakes prior to rolling them to bring about pelleting or nodulizing even though the flakes as formed contain moisture, for example moisture added to the charge prior to compression.

As indicated above, the compression of the charge preferably is conducted between rotating rolls. It is desirable to apply to the charge undergoing flaking a force of the order of a ton per square inch and to produce flakes having a bulk density that is from 10 to 30% greater than that of the uncompressed charge. The rolls are conveniently spaced tightly together when no charge is passing through them, but held by springs so that they open $\frac{1}{16}$ to $\frac{3}{16}$ inch when under load to produce coherent flakes of this thickness. It has been found that the pelleting of flakes of this thickness results in the production of a superior charge.

These and other features of my invention will be understood more thoroughly in the light of the accompanying single figure, which is a flow sheet of apparatus suitable for the practice of the invention.

Referring to the drawing, it will be observed that a finely-divided charge, for example a roasted zinc sulfide ore mixed with suitable fuel such as coal and containing cadmium or lead as an impurity, is charged into a paddle mixer or pug mill 10 from a hopper 11. The charge in the pug mill is moistened with water supplied from a pipe 12.

Conveniently, from 12 to 15% water on the weight of the ore is added in the paddle mixer or pug mill.

After thorough mixing in the pug mill the moist charge, which is somewhat pasty in character, is delivered to compression rolls 14. The rolls turn downwardly toward each other. The charge passes between the rolls and is compressed by them to form flakes.

The rolls discharge the flaked ore upon a chute 15. The flakes, accompanied by a certain amount of fines, some of which may be formed by disintegration of flakes in the chute, pass from the chute into a rotary pelleting drum 16 of conventional construction. Additional water is supplied to the charge in the drum. Preferably, from 2 to 10% of water based on the weight of the ore is supplied to the charge by a spray 17 immediately inside the pelleting drum.

In the pelleting drum the large flakes first partially break down to smaller flakes or fragments and the fines that have escaped agglomeration by the compression rolls or which have broken loose in the chute adhere to the small flakes or fragments. Thus these small flakes or fragments become the nuclei of pellets.

The pellets are discharged from the rotary pelleting drum to a swinging chute 18 or other suitable feeding device which transfers them to the sintering machine (not shown). The subsequent sintering step is conducted in a conventional manner and may well be a blast roasting operation on a Dwight-Lloyd machine.

A binder such as sulfite liquor or tar may be incorporated in the ore in the paddle mixer or pug mill to facilitate the flaking action of the compression rolls, but this in general is unnecessary.

As indicated above, it is appropriate to so operate the compression rolls that the bulk density of the charge is increased by 10 to 30%, that is to say the flaked material delivered by the compression rolls may advantageously possess a bulk density 10 to 30% greater than the unflaked material. Thus in the case of flash roasted zinc ores, the original mixture of ore and sintering fuel may weigh 98 lbs. per cubic foot and the flake mixture formed therefrom about 108 to 127 pounds per cubic foot, this increase in density being brought about by operating the rolls so as to exert a pressure of the order of 2,000 lbs. per square inch.

As indicated hereinbefore, during the actual flaking operation the rolls may open from $\frac{1}{16}$ inch to $\frac{3}{16}$ inch, depending largely on the feed rate and the character of the ore. The bite of the rolls and therefore the thickness and density of the flakes may be regulated by adjusting the compression force of the springs which hold the rolls together.

To obtain maximum strength in the sintered product, the flakes should be made as dense as possible.

About 40 to 50 horsepower is required for the rolls when flaking at the rate of 15 tons per hour.

Care is needed to avoid excessive breakage of flakes as they slide down the chute into the pelleting drum. It is also desirable to adjust the water supply so that it impinges upon the flake material as soon as it enters the rotary pelleting drum. Additional water may be sprayed on the material as it flows through the drum and the water spray advantageously is controlled by the operator at the charging end of the sintering machine. This operator regulates the supply of water so as to obtain a suitably pelleted discharge from the drum.

Sintering of a charge as described above, results in the formation of a hard and uniform sinter that is entirely suitable for subsequent metallurgical operations. The passage of the ore through the densifying rolls breaks up the hard lumps frequently found in ordinary roasted ores and insures excellent mixing with the sintering fuel (such as coal) and with the water—a circumstance leading to increased uniformity of the sinter.

I claim:

1. In the preparation of a finely-divided charge for sintering, the improvement which comprises compressing the charge to form coherent flakes with water, moistening the flakes, and pelleting the moist flakes by rolling them on a surface.

2. In the preparation of a finely-divided charge for sintering, the improvement which comprises moistening the charge, compressing the moist charge to form coherent flakes, wetting the flakes with water and pelleting the moist flakes by rolling them on a surface.

3. In the preparation of a finely-divided charge for sintering, the improvement which comprises compressing the charge between rotating rolls to form coherent flakes, wetting the flakes with water, and pelleting the moist flakes by rolling them on a surface.

4. In the preparation of a finely-divided charge for sintering, the improvement which comprises compressing the charge in a moist condition to form coherent flakes having a bulk density from 10 to 30% greater than the uncompressed charge, wetting the flakes with water, and pelleting the moist flakes by rolling them on a surface.

5. In the preparation of a finely-divided charge for sintering, the improvement which comprises compressing the charge in a moist condition under a force of the order of a ton per square inch to form coherent flakes, wetting the flakes with water, and pelleting the moist flakes by rolling them on a surface.

6. In the preparation of a finely-divided charge for sintering, the improvement which comprises compressing the charge to form coherent flakes, wetting the flakes with water, and pelleting the moist flakes by rolling them on a surface in the presence of moisture and unflaked finely-divided charge.

7. In the preparation of a finely-divided charge for sintering, the improvement which comprises compressing the charge between rolls spaced $\frac{1}{16}$ to $\frac{3}{16}$ inch apart to form coherent flakes, wetting the flakes with water, and pelleting the moist flakes by rolling them on a surface.

8. In the preparation of a finely-divided charge for sintering, the improvement which comprises compressing the charge in a moist condition between rolls spaced $\frac{1}{16}$ to $\frac{3}{16}$ inch apart to form coherent flakes having a bulk density 10 to 30% greater than that of the uncompressed charge, spraying the flakes with water, and pelleting the moist flakes by rolling them within a rotating drum immediately after spraying.

JOHN S. NARATIL.

CERTIFICATE OF CORRECTION.

Patent No. 2,391,588. December 25, 1945.

JOHN S. NARATIL.

It is hereby certified that error appears in the printed specification of the above numbered patent requiring correction as follows: Page 2, second column, line 11, claim 1, for "with water, moistening the flakes, and pelleting" read --moistening the flakes with water, and pelleting--; and that the said Letters Patent should be read with this correction therein that the same may conform to the record of the case in the Patent Office.

Signed and sealed this 16th day of April, A. D. 1946.

(Seal)

Leslie Frazer
First Assistant Commissioner of Patents.